July 22, 1941.  W. J. PHANEUF  2,250,392
BROACH
Filed Oct. 5, 1939
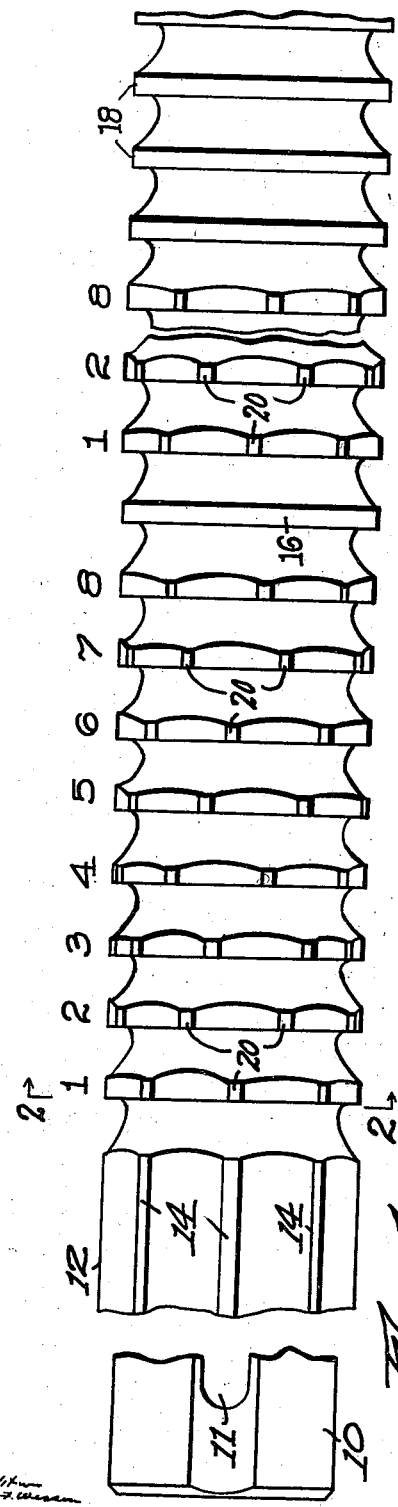
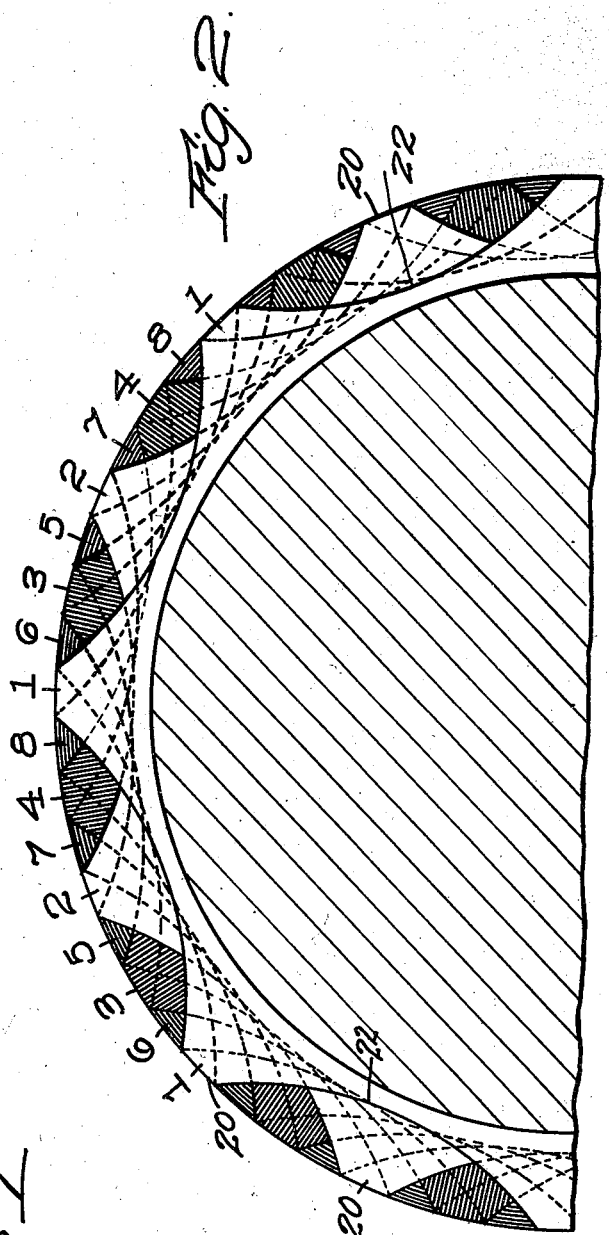
Inventor
W. J. Phaneuf Patented July 22, 1941

2,250,392

UNITED STATES PATENT OFFICE 2,250,392

BROACH

Wilrose J. Phaneuf, Hudson, Mass., assignor to The Lapointe Machine Tool Company, Hudson, Mass., a corporation of Maine Application October 5, 1939, Serial No. 298,143

2 Claims. (Cl. 29—95.1)

This invention relates to broaches for removing stock in finishing operations on metal surfaces of various contours.

It is the general object of my invention to provide a broach which will cut freely and remove stock rapidly, even when broaching rough cored holes, and which will maintain accurate size over a long period of use.

More specifically, I provide a novel arrangement of cutting teeth by which parallel portions of a segment of an internal surface may be successively and separately removed, without side thrust on the broach. A further feature of my invention relates to the provision of increased clearance between the cutting teeth in each cutting section of my improved broach, whereby the broach will cut more efficiently and with greatly reduced friction, resulting in a cooler operating tool.

My invention further relates to arrangements and combinations of parts which will be hereinafter described and more particularly pointed out in the appended claims.

A preferred form of the invention is shown in the drawing, in which—

Fig. 1 is a side elevation of an improved broach of circular section, partially cut away to reduce the length; and Fig. 2 is an enlarged sectional view, taken substantially along the line 2—2 in Fig. 1.

Referring to the drawings, my improved broach comprises an end portion 10 by which the broach may be attached to a puller head, commonly by a key inserted through a transverse slot 11. The broach is also preferably provided with a polygonal entering or pilot portion 12 having non-cutting ribs or angles 14 by which the broach will be approximately centered in a rough or cored hole which may be irregular or having fins or rough protuberances.

The essential novelty of my invention consists in the provision of a series of associated cutting sections (numbered from 1 to 8 inclusive in Fig. 1), together with one or more interposed reaming sections 16, and commonly with a plurality of finishing reaming sections 18.

Each cutting section is polyangular, with a narrow cutting tooth 20 at each angle of each section, and with the stock substantially recessed between the cutting teeth to provide concaved clearance as indicated at 22. Each cutting section in a series is preferably identical in size and shape, but the teeth in successive sections are displaced angularly and preferably cut in the order numbered in Fig. 2.

It will be noted that the teeth 1 first make narrow and relatively deep cuts quite widely separated, after which the teeth 2 make cuts midway between adjacent No. 1 cuts. The teeth 3 and 4 then make cuts at each side of the No. 2 cuts. All of these cuts are made in solid stock, portions of which remain at each side of each cutting tooth, so that there is no side thrust nor tendency to give the broach a spiral twist. The teeth 5, 6, 7 and 8 then successively remove the narrow ribs or portions of stock left between the cuts made by the teeth 1, 2, 3, and 4.

Substantially all of the stock being thus removed, a circumferentially continuous reaming cutter 16 then smooths up the hole, after which a second and similar series of polyangular cutting sections may be used to remove additional stock, and in some cases a third series of cutting sections may be added. At the trailing end of the broach and after the last series of cutting sections, a plurality of reaming sections 18 will be provided, after which a series of plain round teeth are used to accurately size and finish the hole.

A broach thus constructed is found to remove stock easily and rapidly, even from rough cored holes, as the stock is removed by narrow and relatively deep cuts which extend beneath the scale, rather than by shaving or scraping the hardened or chilled surface. This method of cutting also minimizes side drift during the broaching operation, and tends to straighten any curvature in the hole itself, also holding the hole closer to a given lateral location.

The concaved recesses 22 provide more sharply defined corners for the cutting teeth, which is particularly desirable in large broaches, and they also provide ample clearance for chips.

While I have shown the cutting sections as each having eight teeth, and have also shown eight cutting sections in each series, it will be understood that both the number of teeth in each section and the number of sections in a series may be varied for different materials and for different sizes of holes.

Having thus described my invention and the advantages thereof, I do not wish to be limited to the details herein disclosed, otherwise than as set forth in the claims, but what I claim is:

1. A broach comprising a series of polyangular cutting sections, each having the same number of similarly spaced cutting teeth, said sections being so disposed angularly that the teeth of each section of said series are out of axial alignment with the teeth in all other sections of said series, the teeth of each of the cutting sections after the first being so located with reference to teeth of the adjacent sections as to cut midway of the nearest adjacent cuts on each side, made by preceding cutters of the series.

2. A broach comprising a series of polyangular cutting sections, each having the same number of similarly spaced cutting teeth, said sections being non-progressively offset circumferentially in the order of cutting and being so disposed angularly that the teeth of each section in said series are out of axial alignment with the teeth in all other sections of said series, and that each of the teeth in the first several sections of each series cut into solid stock extending circumferentially beyond each cutting tooth at each side thereof, and that the teeth in the remaining section of said series trim off the ridges between two cuts made by the first sections; the teeth of each of the cutting sections after the first being so located with reference to teeth of the adjacent sections as to cut midway of the nearest adjacent cuts on each side, made by preceding cutters of the series.

WILROSE J. PHANEUF.